(12) United States Patent
Weaver

(10) Patent No.: US 7,124,710 B2
(45) Date of Patent: Oct. 24, 2006

(54) CLUMPING ANIMAL LITTER AND METHOD FOR MAKING SAME

(75) Inventor: William R. Weaver, Pine Bluff, AR (US)

(73) Assignee: Planetwise Products, Inc., Pine Bluff, AR (US)

( * ) Notice: Subject to any disclaimer, the term of this patent is extended or adjusted under 35 U.S.C. 154(b) by 20 days.

(21) Appl. No.: 10/935,579

(22) Filed: Sep. 7, 2004

(65) Prior Publication Data

US 2005/0160996 A1 Jul. 28, 2005

Related U.S. Application Data

(60) Provisional application No. 60/539,229, filed on Jan. 26, 2004, provisional application No. 60/539,216, filed on Jan. 26, 2004.

(51) Int. Cl.
*A01K 29/00* (2006.01)
(52) U.S. Cl. .................................................. 119/171
(58) Field of Classification Search ............... 119/174, 119/173, 171, 172
See application file for complete search history.

(56) References Cited

U.S. PATENT DOCUMENTS

| | | |
|---|---|---|
| 3,921,581 A | 11/1975 | Brewer |
| 3,941,090 A | 3/1976 | Fry |
| 4,258,859 A | 3/1981 | Rowell |
| 4,305,345 A | 12/1981 | Otoguro |
| 4,532,890 A | 8/1985 | Ohki et al. |
| 4,560,527 A | 12/1985 | Harke et al. |
| 4,607,594 A | 8/1986 | Thacker |
| 4,788,936 A | 12/1988 | Billings |
| 4,794,022 A | 12/1988 | Johnson et al. |
| 4,949,672 A | 8/1990 | Ratcliff et al. |
| 5,014,650 A | 5/1991 | Sowle et al. |
| 5,044,324 A * | 9/1991 | Morgan et al. ............. 119/171 |
| 5,152,250 A | 10/1992 | Loeb |
| 5,176,107 A | 1/1993 | Buschur |
| 5,183,010 A | 2/1993 | Raymond et al. |
| 5,188,064 A * | 2/1993 | House ....................... 119/172 |
| 5,195,465 A | 3/1993 | Webb et al. |
| 5,207,830 A * | 5/1993 | Cowan et al. ............. 106/672 |
| 5,216,980 A | 6/1993 | Kiebke |
| 5,271,355 A | 12/1993 | Bilings |
| 5,339,769 A | 8/1994 | Toth et al. |
| 5,359,961 A | 11/1994 | Goss et al. |
| 5,526,771 A | 6/1996 | Ito |

(Continued)

FOREIGN PATENT DOCUMENTS

CH 672971 A * 1/1990

(Continued)

OTHER PUBLICATIONS

English translation of DE 200 17 395 U 1 text.

(Continued)

*Primary Examiner*—Teri Pham Luu
*Assistant Examiner*—Kimberly S. Smith
(74) *Attorney, Agent, or Firm*—J. Charles Dougherty

(57) ABSTRACT

A clumping animal litter comprises an organic material, a surfactant, and a clumping agent. The clumping agent may be a combination of carboxymethylcellulose (CMC) and guar gum. The material may comprise 1–2% CMC, 3–6% guar gum, 1–5% surfactant, and the remainder wood fiber. The material is formed into pellets with a uniform distribution of the various ingredients. The pellets are then crumbled to improve absorption characteristics. The mixture results in a fully-biodegradable, organic-based litter product with improved clumping abilities, natural odor control, and ease of litter pan maintenance.

17 Claims, 1 Drawing Sheet

U.S. PATENT DOCUMENTS

| | | | |
|---|---|---|---|
| 5,577,463 A * | 11/1996 | Elazier-Davis et al. | 119/173 |
| 5,664,523 A * | 9/1997 | Ochi et al. | 119/173 |
| 5,860,391 A | 1/1999 | Maxwell et al. | |
| 5,927,049 A | 7/1999 | Simard | |
| 5,970,916 A * | 10/1999 | Yoder et al. | 119/173 |
| 6,029,395 A * | 2/2000 | Morgan | 47/9 |
| 6,053,125 A | 4/2000 | Kory et al. | |
| 6,076,299 A * | 6/2000 | Spittle et al. | 47/9 |
| 6,089,189 A * | 7/2000 | Goss et al. | 119/173 |
| 6,089,190 A | 7/2000 | Jaffee et al. | |
| 6,148,768 A | 11/2000 | Ochi et al. | |
| 6,294,118 B1 * | 9/2001 | Huber et al. | 264/118 |
| 6,360,478 B1 * | 3/2002 | Spittle | 47/9 |
| 6,371,050 B1 * | 4/2002 | Mochizuki | 119/172 |
| 6,662,749 B1 * | 12/2003 | Wiedenhaft et al. | 119/172 |
| 6,688,038 B1 * | 2/2004 | Paternoster et al. | 47/9 |
| 6,837,181 B1 * | 1/2005 | Schulein et al. | 119/171 |
| 2002/0038633 A1 | 4/2002 | Hayakawa | |

FOREIGN PATENT DOCUMENTS

| | | |
|---|---|---|
| DE | 19543311 A * | 11/1999 |
| DE | 200 17 395 U 1 | 10/2000 |
| DE | 200 17 396 U 1 | 10/2000 |
| EP | 0 165 820 A2 | 12/1985 |
| EP | 0 407 064 A1 | 1/1991 |
| EP | 0 585 928 A1 | 3/1994 |
| WO | WO-97/18702 A2 | 5/1997 |
| WO | WO-97/18702 A3 | 5/1997 |

OTHER PUBLICATIONS

English translation of DE 200 17 396 U 1 text.

* cited by examiner

CLUMPING ANIMAL LITTER AND METHOD FOR MAKING SAME

This application claims the benefit of U.S. provisional patent application No. 60/539,229 entitled "Clumping Pine Wood Cat Litter" and filed on Jan. 26, 2004 by inventor William R. Weaver, and U.S. provisional patent application No. 60/539,216, entitled "Fast Absorption Animal Litter" and also filed on Jan. 26, 2004 by William R. Weaver.

BACKGROUND OF THE INVENTION

The present invention relates to animal litters, and in particular to clumping animal litters based on organic materials.

Various clays (primarily bentonite) have been used as a base material for absorbent animal litters for some time. These materials become tacky when wetted, thereby forming a "clump" that is easily removed when cleaning a litter box. Many animals, cats in particular, will often refuse to use a litter box that is not kept scrupulously clean. Clumping animal litters facilitate ease of cleaning since otherwise the litter box must be periodically dumped and refilled to maintain appropriate cleanliness.

An important disadvantage of clay-based litters is that they aggressively stick to the sides and bottom of the litter pan when wetted. This tendency makes removal of the clumped litter more difficult, partially defeating the purpose of the clumping action. Litter stuck to the sides and bottom of the litter pan also requires more frequent replacement of the litter box itself, since the animal urine odor will be imparted to the plastic or other porous or semi-porous material from which the litter box is formed. It would thus be desirable to develop a litter material that results in "softer" clumps, that is, clumps that stick together sufficiently for removal from the litter pan but that do not stick as easily to the sides and bottom of the litter pan.

It has been recognized that a litter based on organic materials rather than clays would be highly desirable. Organic materials, such as sawdust and lumber mill scraps, are readily available and inexpensive. They are more absorbent than clay materials, and naturally contain chemicals that will control odor. Organic materials may be formed into pelletized shapes using a pellet mill; such mills have long been used in the manufacture of animal feed. A significant drawback of organic materials, however, is that litters based on organic materials have historically lacked the highly desirable clumping feature of clay litters. Attempts to develop clumping organic litters have been unsuccessful due to the techniques of production attempted, and the high cost of the various ingredients used to create the clumping action in an organic-based litter.

The related art includes a number of attempts to develop cellulosic materials in the manufacture of animal litter, and in particular the use of wood particles. For example, U.S. Pat. No. 3,941,090 to Fry teaches a cedar-based animal litter with an alfalfa binding agent. U.S. Pat. No. 4,258,659 to Rowell teaches a cat litter comprising soft wood particles formed from waste wood material, including sawdust and wood pieces, collected from sawmills. U.S. Pat. No. 5,044,324 to Morgan et al. teaches the manufacture of wood fiber "crumbles" that may be used as animal litter; the crumbles are formed from the grinding of pelletized wood fiber. U.S. Pat. No. 5,271,355 teaches the combination of ground wood chips and peat to form animal litter.

The related art also includes a class of improved clay-based clumpable litters, that is, litters that have an especially strong tendency to agglomerate in the presence of moisture. These litters materials are generally composed of a substrate material to which a coating is applied; the coating portion of the material provides the clumping action. For example, U.S. Pat. No. 5,014,650 to Sowle et al. teaches an animal litter with a porous, inert solid substrate, such as clay, and a coating composed of a water-absorbent polymer. U.S. Pat. No. 5,339,769 to Toth et al. teaches a method of forming such a litter in which a liquid clumping agent is distributed over a dry blend of materials that may include an inert solid substrate and a clumping agent.

This pellet coating technology has also been applied to litters based on organic materials; for example, U.S. Pat. No. 5,970,916 to Yoder et al. teaches a litter material composed of a cellulosic substrate with a first layer of xanthan gum and a second layer of guar gum. Also, U.S. Patent Application Publication No. 2002/0038633 to Hayakawa teaches a cellulose ether as a binder that is responsible for a clumping action in a litter composed partially of organic material. As noted in Hayakawa, however, the use of cellulose ether increases the manufacturing cost of the product, and the goal of Hayakawa was to develop a product that required the use of cellulose ether in smaller quantities. Hayakawa teaches that this is achieved through the selection of high molecular weight—that is, high viscosity—cellulose ethers. The base material or substrate taught by Hayakawa includes inorganic minerals, such as bentonite clays, as well as organic materials.

The use of various gums, including guar gum, and carboxymethylcellulose (CMC) are known in the manufacture of animal litters, and in particular in the manufacture of animal litters that contain organic materials. U.S. Pat. No. 5,664,523 to Ochi et al. teaches a base litter material that includes both organic and inorganic components, but also includes 15–55% guar gum by weight. U.S. Pat. No. 6,053,125 to Kory et al. teaches a clumpable cat litter formed of corncob grit and components that are coated with guar gum. U.S. Pat. No. 6,089,189 to Goss et al. teaches a cellulose-based litter product wherein cellulosic granules are treated with an adhesive and mixed with a particulate polymeric clumping agent, preferably guar or locust bean gum.

A significant drawback of all known animal litters with clumping action is that they are not readily flushable. To the inventor's knowledge, all of those commercially available litters that are advertised as flushable, including both clay-based and grain-based litters, also require a soaking period before flushing, typically ten minutes or so. None of these products allow the pet owner to simply scoop the clumped litter from the box, dispose of the clump in the toilet, and flush immediately without substantial risk of a clog or damage to plumbing. This is a significant inconvenience, since the pet owner must remember to return at a later time in order to flush the material. Failure to allow sufficient soaking time with these litters may result in clogged plumbing.

The inventor's experiments have determined that none of the available and tested litter products are fully successful in combining the advantages of an organic litter material with the clumping action of a clay litter, to result in a product that may be manufactured at a competitive cost. The inventor has recognized that an ideal clumping litter would eliminate the use of clay or other inorganic base materials, and would maximize the quantity of inexpensive organic materials with respect to any required additives. The limitations of the related art as described herein are overcome by the present invention as described below.

BRIEF SUMMARY OF THE INVENTION

The present invention is directed to an animal litter composed primarily of organic materials, preferably wood fiber, with the addition of a surfactant and one or more clumping agents. The surfactant improves the absorption qualities of the material, thereby making the product's natural odor control properties most effective, and allows the use of a greater percentage of base organic material, thereby controlling cost. In one aspect of a preferred embodiment of the invention, a particular blend of two clumping agents may be used for maximum effectiveness. No inorganic base materials are required in this formulation in order to achieve a product with the desired properties. Unlike related art materials that comprise a substrate and a coating that provides clumping action, the present invention utilizes a mix of the base organic material, surfactant, and clumping agent throughout the product. No separate coating is used, thereby reducing the manufacturing cost of the product. Further, in the preferred embodiment the product includes more than 90% wood fiber, further reducing the cost of the product given the very low cost of wood fiber as waste from lumber mills and the like. The product is pelletized, then crumbled in order to increase surface area and thus improve moisture absorption. The minimum size of the crumbles is limited, however, since if the particle size drops too small the product will be easily tracked by an animal out of the litter pan and excessive dust may result when the product is transferred.

The litter exhibits the desired clumping action, but does not readily stick to the sides of the litter pan. In other words, the formulation may achieve a "soft" clumping action to optimize the ease of use of the product. The material is non-toxic and fully biodegradable, and thus may be disposed of in any standard manner, or even used as compost. The material is flushable, and because of its re-wetting action may be flushed immediately upon deposit in the toilet. Because the product allows easy removal of clumps, it will last longer than traditional litters, and thus results in an effectively less expensive product for the user.

The present invention also comprises a method of manufacturing the animal litter described herein. Wood fiber is purchased as waste from the lumber or paper industry. The material is metered with the surfactant and clumping agent or agents by weight, and mixed as the mill grinds the wood fibers to a consistent size. The mixture is then pelletized, and the resulting pellets are cooled before crumbling.

It is therefore an object of the present invention to provide for a clumping animal litter based on low-cost organic materials.

It is a further object of the present invention to provide for a litter that is biodegradable.

It is also an object of the present invention to provide for a litter that is flushable without any required wait before flushing.

It is also an object of the present invention to provide for a litter that forms "soft" clumps, that is, it does not readily stick to the litter pan upon being wetted.

It is also an object of the present invention to provide for a litter that does not require the use of clays or other inorganic base materials.

It is also an object of the present invention to provide for a litter that has its clumping agent mixed throughout the litter pellets rather than present in a separate coating on the outside of the pellets in order to contain manufacturing costs.

It is also an object of the present invention to provide a litter that naturally contains chemicals to control odor.

These and other features, objects and advantages of the present invention will become better understood from a consideration of the following detailed description of the preferred embodiments and appended claims in conjunction with the drawing as described following:

DETAILED DESCRIPTION OF THE INVENTION

Figure 1:
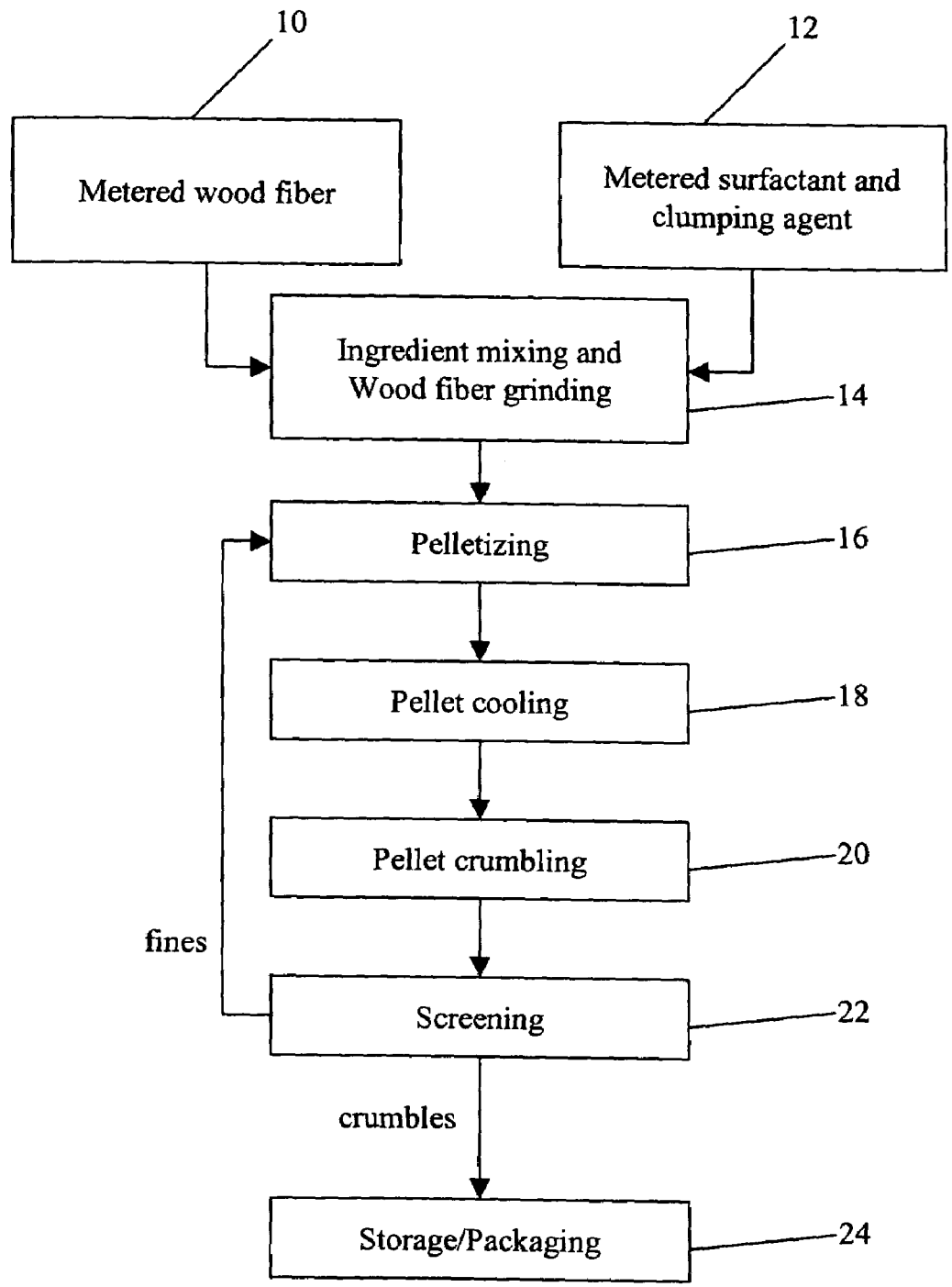
FIG. 1 is a flow chart describing a process for manufacturing animal litter according to a preferred embodiment of the present invention.

A preferred embodiment of the present invention may now be described. The preferred embodiment is formed of three constituent components: kiln-dried, yellow pine wood fiber, a nonionic surfactant, and one or more clumping agents.

Yellow pine is a commonly used lumber and pulpwood material, and lumber mill scraps of material are available for use in the production of litter at low cost. The yellow pine is preferably purchased as a kiln dried material, but will be in various sizes ranging from wood pieces to sawdust. The litter manufacturing facility should ideally be located near a dimension lumber mill operation or other facility that produces yellow pine scraps in order to reduce transportation costs.

The purpose of the non-ionic surfactant is to increase the rate of moisture absorption. Quick absorption reduces the likelihood that the material will stick to the sides or bottom of the litter pan, and also makes clumps easier to remove since they will be found more near the litter surface. Quick absorption also improves the odor control exhibited by the product, since urine is quickly absorbed into the litter and odor is thereby trapped within. Several different surfactants may be used in alternative embodiments of the invention. These surfactants include T-Det N9 or T-Det NP9 from Harcros Chemicals; Standapol WAQ-LC from the Cognis Corporation; and Wickit 1362 by Hercules Corporation. The absorption rates of each of these surfactants are quite close to one another, and any may be used with the present invention with success. Alternative embodiments may comprise a combination of two or more surfactant formulations based on availability and cost considerations. In the preferred embodiment, the percentage of surfactant in the product by total product weight is in the range of 1–5%. This range is sufficient to ensure sufficient absorption qualities of the product, including sufficient absorption to allow immediate flushing of the product upon deposit in a toilet. A higher rate of surfactant usage will result in quicker absorption in the product.

The clumping agents employed in the preferred embodiment of the invention are carboxymethylcellulose (CMC) and guar gum. CMC is available commercially in a myriad of forms. The inventor has found that CMC with a high viscosity is more desirable for use as a tacking or clumping agent in litter, preferably CMC with 8000 cps or higher. If CMC is used as the sole clumping agent, without the addition of guar gum, the best clumping action is achieved. The clumps will form more quickly and will become harder. A high percentage of CMC in the product, however, results in a greater tendency for moisture to puddle on the surface of the litter. Once exposed to an initial amount of moisture, the CMC appears to form a moisture barrier, and actually retards or, in very high percentages of total product by weight, even prohibits total moisture absorption. Also, a hard clumping may lead to the sticking of clumps to the sides of a litter box. Finally, CMC is relatively expensive compared to other components in the mixture. The preferred percentage by total weight of CMC as a proportion of the total product is thus in the range of 1–2%.

Guar gum, like CMC, is commercially available in a wide variety of forms, including food grade and technical grade and many variations as to grind (that is, particle size). It has been found by the inventor that finer grinds are preferred. When used without other tacking or clumping agents, guar gum is not satisfactory as a clumping agent, since the clumps formed by guar gum do not maintain integrity sufficiently for easy removal from a litter box. Clumps that break apart during removal are highly undesirable, and may defeat the purpose of using a clumping agent in the litter material entirely. In addition, when only guar gum is used as a clumping agent the percentage of guar gum by weight as a proportion of the total product must be very high in order to be effective, around 10–15% at a minimum. An advantage of guar gum, however, is that it does not form a barrier to moisture at any percentage of total product by weight.

In the preferred embodiment, the clumping agent used with respect to the invention is a combination of CMC and guar gum in a mix that optimizes the best properties of both agents. It has been found that a 1–2% by weight addition of CMC improves the clumping characteristics of the guar gum, thus allowing the amount of guar gum to be reduced and still result in acceptable "soft" clumping. The clumps will remain intact during ordinary removal, but will not readily stick to the sides of the litter pan. Further in the preferred embodiment, the amount of guar gum may be in the range of 3–6% by total weight of product. This combination of CMC and guar gum still results in more than 90% of the total product weight as wood fiber, thereby maintaining the production cost of the product at a level where it may feasibly be introduced onto the market in competition with clay- and grain-based animal litter products. It may be further noted that the preferred total moisture content of the pellets according to the preferred embodiment is between 5–8% by total product weight.

The animal litter formed according to the preferred embodiment of the invention is made entirely from non-toxic products and is fully biodegradable. It may thus be disposed of in any conventional and convenient manner without concern about harm to the environment. The animal litter may alternatively be composted. The product does not form clumps that are as hard as the clumps produced by clay- and grain-based litters, and thus will not adhere aggressively to the litter pan. The clumps are hard enough, however, to be easily scooped from a litter pan while maintaining their integrity. The clumps serve to encapsulate wastes, thus reducing and inhibiting the growth of bacteria and controlling the related odors. Although the clumps do become harder over time as they dry, the clumps readily and quickly absorb additional moisture, and thus may be deposited into a toilet and flushed immediately. Because of its quick-clumping action, less litter is used in order to remove a given amount of waste, and thus the life of the product is extended. It was found in testing that 3–4 pounds of the preferred embodiment of the present invention would last for approximately one month of use by an average-sized cat in a standard litter pan, while approximately 7 pounds of non-clumping pine pellets were required over the same period. Finally, because the pellet crumbles of the preferred embodiment resemble traditional clay litters, the product encourages acceptance by animals accustomed to clay litters.

Now with reference to FIG. 1, the preferred embodiment of the present invention for producing the animal litter as described above may be described. At step 10, wood fiber is metered by weight into the production facility. Surfactant and clumping agent materials are metered by weight at step 12. The wood fiber, surfactant, and clumping agent are brought together at step 14, where the wood fiber is ground to a uniform fiber consistency. The grinding action results in the simultaneous mixing of the wood fiber, surfactant, and clumping agent, such that a uniform mixture of the three materials may result. It should be noted that while the metering of surfactant and the clumping agent are shown as a single step 12, each ingredient is actually metered separately. In various embodiments, there may be only one material used for each of the surfactant and a clumping agent, or various materials may be used together in a mixture to form each of these components. In alternative embodiments, the grinding and ingredient mixing steps may be performed separately.

Material is moved from a holding bin above the pellet mill into the mill itself at pelletizing step 16. In step 16, pellets of material are formed by extrusion. Due to the thorough mixing at step 14, the resulting pellets will have a uniform distribution of each material throughout their volume. The extrusion process in the pellet mill generates significant heat, and the resulting pellets are quite hot. The pellets are thus transported, by conveyor or other means, to a cooling step at block 18. Once cooled, the pellets are crumbled into granules at block 20, preferably using an adjustable, dual-roller pellet crumbling mechanism. As pellets pass between the tightly-spaced rollers of such a device, the pellets are granulized into smaller pieces, but they are not ground into a dust. Preferably, the gap between the rollers in the crumbling mechanism is between 0.015 and 0.025 inches. At this setting, the crumbles are not so small that they are easily tracked by an animal using the litter box. The crumbles are small enough, however, to readily absorb moisture. The expected particle size range for most crumbles with this roller gap setting is between 0.010 and 0.180 inches.

The screening process at step 20 results in both pellet crumbles and some fine, dusty material. The screening step at block 22 is used to separate the crumbles from the fines. The fines are returned to the pelletizing step at block 16 for reuse in the formation of pellets. The finished crumbles are passed to step 24, which may include storage as an intermediate step and eventual packaging for shipment to distribution points. As noted above, finished crumble size is an important factor for optimal clumping and dust control.

The present invention has been described with reference to certain preferred and alternative embodiments that are intended to be exemplary only and not limiting to the full scope of the present invention as set forth in the appended claims.

What is claimed is:

1. A clumping animal litter, comprising:
   (a) an organic base material;
   (b) a surfactant; and
   (c) a clumping agent comprising 1–2% carboxymethylcellulose (CMC) by total product weight, wherein said litter is formed of granules, and said organic base material, said surfactant, and said clumping agent are distributed approximately evenly throughout said granules.

2. The animal litter of claim 1, wherein said organic base material is wood fiber.

3. The animal litter of claim 2, wherein said organic base material is yellow pine wood fiber.

4. The animal litter of claim 2, wherein the litter comprises a total moisture content of 5–8% by total product weight.

5. The animal litter of claim 2, wherein said clumping agent further comprises guar gum.

6. The animal litter of claim 5, wherein said clumping agent is comprised of 3–6% guar gum by total product weight.

7. The animal litter of claim 2, wherein said litter is composed of at least 90% wood fiber by total product weight.

8. The animal litter of claim 7, wherein said litter is composed of 1–5% surfactant by total product weight.

9. The animal litter of claim 2, wherein said granules are crumbled pellets.

10. The animal litter of claim 9, wherein said granules are predominantly of a size in the range of 0.010 to 0.180 inches.

11. A process for manufacturing a clumping animal litter, comprising the steps of:
（a) providing an organic base material;
(b) mixing the organic base material, a surfactant, and a clumping agent comprising 1–2% carboxymethylcellulose (CMC) by total product weight to form an approximately uniform mixture; and
(c) granulizing said mixture to form granules, wherein said granules comprise a uniform mixture of the organic base material, the surfactant, and the clumping agent throughout the granules.

12. The process of claim 11, wherein said granulizing step comprises the passing of pellets between rollers with a gap in the range of 0.015 to 0.025 inches.

13. The process of claim 11, wherein said granulizing step results in the production of crumbles predominantly of a size in the range of 0.010 to 0.180 inches.

14. The process of claim 12, further comprising the step of metering the organic base material, the surfactant, and the clumping agent prior to said mixing step.

15. The process of claim 14, further comprising the step of screening crumbled pellets to separate crumbles from fines, and returning any fines to said granulizing step.

16. The process of claim 15, further comprising the step of collecting the mixture in a holding bin prior to said granulizing step.

17. The process of claim 11, wherein said providing and mixing steps occur simultaneously.

* * * * *